United States Patent [19]

Ishikuro et al.

[11] Patent Number: 5,075,180

[45] Date of Patent: Dec. 24, 1991

[54] MAGNETIC RECORDING MEDIUM AND METHOD FOR PREPARING THE SAME

[75] Inventors: Tadashi Ishikuro; Shinobu Iida; Masaaki Fujiyama, all of Kanagawa, Japan

[73] Assignee: Fuji Photo Film Co., Ltd., Kanagawa, Japan

[21] Appl. No.: 337,780

[22] Filed: Apr. 13, 1989

[30] Foreign Application Priority Data

Apr. 13, 1988 [JP] Japan .................. 63-90864

[51] Int. Cl.$^5$ .................................. G11B 23/00
[52] U.S. Cl. .................. 428/694; 427/131; 428/425.9; 428/900
[58] Field of Search ........... 428/323, 694, 900, 425.8; 427/131

[56] References Cited

U.S. PATENT DOCUMENTS

| 4,135,016 | 1/1979 | Ogawa et al. ............ 428/900 |
| 4,135,031 | 1/1979 | Akashi et al. ............ 428/900 |
| 4,328,935 | 5/1982 | Steel ...................... 428/900 |
| 4,388,376 | 7/1983 | Kubota et al. ........... 428/694 |
| 4,389,458 | 6/1983 | Hosaka et al. .......... 428/694 |
| 4,419,406 | 12/1983 | Isobe et al. ............. 428/900 |
| 4,664,979 | 5/1987 | Yamada et al. ......... 428/694 |
| 4,693,929 | 9/1987 | Ryoke et al. ........... 428/694 |

Primary Examiner—Paul J. Thibodeau
Attorney, Agent, or Firm—Sughrue, Mion, Zinn, Macpeak & Seas

[57] ABSTRACT

A magnetic recording medium comprising a support having provided on one surface thereof a magnetic layer, and on the opposite surface thereof a backing layer comprising nonmagnetic particles dispersed in a binder, wherein the binder in the backing layer comprises a vinyl chloride-vinyl acetate copolymer of from 50 to 80 parts by weight, a polyester resin of from 1 to 40 parts by weight, and a polyisocyanate of from 10 to 49 parts by weight, per 100 parts by weight of the binder.

4 Claims, No Drawings

MAGNETIC RECORDING MEDIUM AND METHOD FOR PREPARING THE SAME

FIELD OF THE INVENTION

This invention relates to a magnetic recording medium having an improved backing layer and a method for preparing the same, and more particularly it relates to a magnetic recording medium having a low friction coefficient without decreasing S/N ratio, having excellent running durability without increasing dropouts and having a backing layer with improved hydrolysis resistance, wherein head clogging hardly takes place, and the method for preparing the same.

BACKGROUND OF THE INVENTION

Generally a surface of a magnetic recording layer of a magnetic recording tape such as an audio tape, a video tape or a tape for computers is finished to be smooth to improve sensitivity (outputs particularly in the high frequency band). However, such a smooth magnetic recording tape winds irregularly during winding-up and during rewinding. As a result, running properties are deteriorated due to fluctuation of tension strength, outputs fluctuate and the tape tends to deform or to be damaged.

To remove the above defects, a magnetic tape having a backing layer on the nonmagnetic support on the opposite surface to a magnetic layer has been developed and has been put into practice. Various resin compositions for the binder used in the backing layer have been suggested, such as (1) a mixture of a vinyl chloride-vinyl acetate copolymer, a polyurethane resin, and a polyisocyanate, (2) a mixture of a vinyl chloride-vinyl acetate copolymer, a fiber resin, a polyurethane resin, and a polyisocyanate, and (3) a mixture of a fiber resin, a polyurethane resin, and a polyisocyanate. See, for example, JP-A-57-208635 and JP-A-57-208636 (the term "JP-A" as used herein refers to a "published unexamined Japanese patent application"). In the above-described binder compositions, polyurethane resins are always contained therein as a main component. Polyurethane resins are generally poor in hydrolysis resistance. Accordingly, such binder compositions suffer from the defect that the polyurethane resins hydrolyzed in the backing layer is adhered to the magnetic layer, thereby causing head clogging while a tape is running, and as a result, recording and reproducing cannot be done.

When polyurethane resins are used as a binder, there is also the defect that the friction coefficient increases and the backing layer readily tends to be worn out.

In a magnetic recording medium having a backing layer to improve running characteristics and running durability, the surface of the backing layer is often made rough to improve running, because of the emphasis on running characteristics. As a result, when a magnetic recording medium in the shape of a tape is wound to a rolled state, and is stored for a long period of term, and when a magnetic recording medium in the shape of a sheet is piled or stacked and is stored for a long period of term, the unevenness on the surface of the backing layer is printed onto the surface of the magnetic layer and the surface property of the magnetic layer deteriorates. For the above reason, electromagnetic characteristics, particularly S/N characteristics of the magnetic recording medium deteriorate.

SUMMARY OF THE INVENTION

An object of this invention is to provide a magnetic recording medium having excellent running durability without increasing dropouts and having a backing layer with improved hydrolysis resistance, wherein head clogging hardly takes place, and the method for preparing the same.

Other objects of this invention are to provide a magnetic recording medium having a backing layer wherein S/N ratio is not decreased without deteriorating the surface property of the magnetic layer even when the magnetic recording medium is stored in a piled state, and to provide the method for preparing the same.

To achieve the above and other objects, the present invention provides a magnetic recording medium comprising a support having provided on one surface thereof a magnetic layer, and on the opposite surface thereof a backing layer comprising nonmagnetic particles dispersed in a binder, wherein the binder in the backing layer comprises a vinyl chloride-vinyl acetate copolymer of from 50 to 80 parts by weight, a polyester resin of from 1 to 40 parts by weight, and a polyisocyanate of from 10 to 49 parts by weight, per 100 parts by weight of the binder.

The present invention also relates to a method for preparing a magnetic recording medium which comprises coating a magnetic coating composition containing ferromagnetic particles on one surface of a nonmagnetic support to form a magnetic layer, and coating on the opposite surface of the nonmagnetic support a nonmagnetic coating composition containing nonmagnetic particles dispersed in a binder containing a vinyl chloride-vinyl acetate copolymer of from 50 to 80 parts by weight, a polyester resin of from 1 to 40 parts by weight and a polyisocyanate of from 10 to 49 parts by weight, per 100 parts by weight of the binder, to form a backing layer, wherein the nonmagnetic coating composition is prepared by mixing and kneading the nonmagnetic particles, a part of the above-described binder, and a part of a solvent by a kneader under pressure or a roll, and then dispersing the resulting kneaded mixture in the rest of materials for the nonmagnetic coating composition.

DETAILED DESCRIPTION OF THE INVENTION

A magnetic recording medium comprising a nonmagnetic support having provided on one surface thereof a magnetic layer, and on the opposite surface thereof a backing layer is already known. In the present invention, the novel and improved feature resides in the backing layer. Thus, the remaining portions of the magnetic recording medium (other than the backing layer) can be prepared in accordance with the prior art regarding the materials, the shape and the like.

For example, as a nonmagnetic support, plastics such as polyethylene terephthalate, metals and ceramics can be used, and any shapes such as a tape, a disk, a drum or the like can be used, and pretreatment can be done if necessary.

The magnetic layer is a layer containing ferromagnetic particles dispersed in a binder. As ferromagnetic particles, γ-iron oxide ferromagnetic particles, cobalt containing γ-iron oxide ferromagnetic particles, ferromagnetic metal particles, barium ferrite and strontium ferrite can be used. Additives known by themselves can be added optionally into the magnetic layer.

The characteristic feature of the magnetic recording medium of this invention resides in the backing layer and, therefore, the structure of the backing layer will be mainly illustrated hereinafter.

The binder for use in the backing layer is a binder containing a copolymer of vinyl chloride and vinyl acetate, a polyester resin and a polyisocyanate.

The above-described copolymer of vinyl chloride and vinyl acetate can be any copolymer of vinyl chloride and vinyl acetate known by itself. Particularly preferred copolymers of vinyl chloride and vinyl acetate are those resins having an average degree of polymerization of from 400 to 500, preferably from 400 to 450, and wherein the structural unit derived from vinyl acetate is present in an amount of from 1 to 15 wt%, preferably from 2 to 13 wt%, based on the weight of the copolymer. The copolymer of vinyl chloride and vinyl acetate contributes to improve the dispersibility of the nonmagnetic particles in the binder. If the amount of the structural unit derived from vinyl acetate in the copolymer of vinyl chloride and vinyl acetate is higher than the above-described range, not only the strength of the backing layer but also the dispersibility of the nonmagnetic particles tend to decrease and if the amount thereof is lower than the above-described range, solubility of the copolymer of vinyl chloride and vinyl acetate tends to decrease.

As the above-described polyester resin, there can be used polyester resins prepared in a conventional manner, by reacting a dibasic acid preferably having up to 20 carbon atoms, such as oxalic acid, malonic acid, succinic acid, glutaric acid, adipic acid, sebacic acid, dodecanoic acid, tetrahydrophthalic acid, fumaric acid, maleic acid, itaconic acid, trimethyladipic acid or the like, and a dihydric alcohol preferably having up to 20 carbon atoms, such as ethylene glycol, trimethylene glycol, diethylene glycol, 2,2-dimethylpropane-1,3-diol, cyclohexane-1,3-diol, tetraethylene glycol or the like. Further, polyester resins derived from lactones preferably having up to 20 carbon atoms, such as γ-butyrolactone, δ-valerolactone or ε-caprolactone can be used.

As the above-described polyisocyanate, compounds having at least two but not more than 50 and preferably 20 or less of the isocyanate groups can optionally be used. Such polyisocyanates include, for example, isocyanates preferably having up to 200 carbon atoms, such as tolylene diisocyanate, 4,4,'-diphenylmethane diisocyanate, hexamethylene diisocyanate, xylylene diisocyanate, naphthylene-1,5-diisocyanate, o-toluidine diisocyanate, isophorone diisocyanate or triphenylmethane triisocyanate, the reaction products of these isocyanates and polyalcohols such as trimethylolpropanes, and polyisocyanates produced by condensing these isocyanates. The above-described polyisocyanates are commercially available under the trade names of "Coronate L", "Coronate HL", "Coronate 2030", "Coronate 2031", "Millionate MR" and "Millionate MLT" produced by Nippon Polyurethane Co., Ltd., "Takenate D-102", "Takenate D-110N", "Takenate D-200" and "Takenate D-202" produced by Takeda Chemical Industries, Ltd., and "Desmodule L", "Desmodule IL", "Desmodule N" and "Desmodule HL" produced by Sumitomo Bayer Co., Ltd.

The compounding ratio of the above-described resins in the binder for the backing layer is that the copolymer of vinyl chloride and vinyl acetate is present in an amount of from 50 to 80 parts by weight (preferably from 55 to 75 parts by weight), the polyester resin is present in an amount of from 1 to 40 parts by weight (preferably from 1 to 20 parts by weight), and the polyisocyanate is present in an amount of from 10 to 49 parts by weight (preferably from 15 to 45 parts by weight), per 100 parts by weight of the binder.

If the amount of the copolymer of vinyl chloride and vinyl acetate is lower than the above-described range, the dispersibility decreases and the surface property also decreases. If the amount thereof is higher than the above range, the coating composition itself becomes very viscous and is not suitable for coating. If the amount of polyester resins is lower than the above range, the film becomes hard and brittle and durability deteriorates. If the amount thereof is higher than the above range, the film becomes soft and easily be worn out. If the amount of polyisocyanate is lower than the above range, adhesiveness decreases, and if the amount thereof is higher than the above range, most portions of the film are unhardened and durability tends to decrease.

As the nonmagnetic particles to be dispersed in the binder of the backing layer, conventional nonmagnetic particles can be used to adjust the surface roughness and the electric resistance of the backing layer.

As nonmagnetic particles, carbon black, graphite and inorganic filling materials can be used. These particles can be used alone or in mixture. The inorganic filling materials are those commonly used as abrasive agents such as $TiO_2$, $TiO$, $ZnO$, $CaO$, $MgO$, $SnO_2$, $SiO_2$, $\alpha$-$Fe_2O_3$, $Cr_2O_3$, $\alpha$-$Al_2O_3$, $ZnS$, $MoS_2$, $BaSO_4$, $CaSO_4$, $MgCO_3$, $BN$ or $SiC$. These inorganic filling materials can be used alone or in mixture.

It is preferred to use carbon black among the above-described nonmagnetic particles. As carbon black, furnace black, thermal black, black for coloring and acetylene black can be used. Regarding the properties of carbon black, it is preferred that the average particle size be from 5 to 1,000 mμ (by electromicroscope), the specific surface area by nitrogen adsorption method be from 1 to 800 m²/g, the pH be from 4 to 11 (JIS K6221), and the dibutyl phthalate oil absorption amount be from 10 to 800 ml/100 g (JIS K6221). Regarding the size of carbon black, carbon black of from 5 to 100 mμ can be used to reduce the surface electric resistance of the coated film. Carbon black of from 50 to 1,000 mμ can be used to adjust the strength of the coated film. Fine carbon black of 100 mμ or lower can be used to adjust the surface roughness of a coated film and to smooth the surface to bring about a reduction of spacing loss. Coarse carbon black of 50 mμ or higher can be used to roughen the surface to decrease friction coefficient. Fine carbon black and coarse carbon black can be used in combination. Carbon black in which a part of its surface is graphited or grafted may be used.

The particle size of other nonmagnetic particles are not particularly limited, and commonly used particle sizes can be used. For example, when inorganic filling materials are used, the average particle diameter thereof is preferably from 0.01 to 10 μm, particularly preferably from 0.5 to 5 μm.

Also, it is preferred to use the above-described carbon black and the above-described inorganic filling materials in combination, and, for example, a mixture of 100 parts of carbon black and from 0.5 to 50 parts by weight, preferably from 0.5 to 30 parts by weight, of α-$Al_2O_3$ is preferred.

The nonmagnetic particles can be spherical, acicular, plate-like and dice-like.

Regarding the compounding ratio of the non-magnetic particles and the binder used in the backing layer of the magnetic recording medium of this invention, it is preferred to use from 0.1 to 40 parts by weight, more preferably from 0.2 to 20 parts by weight, of the non-magnetic particles per 1 part by weight of the binder. If the compounding ratio of the nonmagnetic particles is higher than the above-described range, running durability of the magnetic recording medium deteriorates, and if the ratio thereof is lower than the above range, the filling density of the nonmagnetic particles decreases and, as a result, desired surface electric resistance in the backing layer of the magnetic recording medium cannot be obtained and the friction coefficient tends to increase.

In the magnetic recording medium of this invention, it is necessary that the nonmagnetic particles should be sufficiently homogeneously dispersed in the binder of the backing layer. Particularly when carbon black is used as nonmagnetic particles, which has low dispersibility, the surface property of the backing layer deteriorates and unevenness on the backing layer becomes great, and as a result, electromagnetic characteristics (S/N) of the magnetic recording medium tend to decrease.

A magnetic recording medium having a backing layer containing the nonmagnetic particles having strikingly improved dispersibility dispersed in the binder can be obtained by using a nonmagnetic coating composition for forming a backing layer which is prepared by mixing and kneading the nonmagnetic particles, a part of the above-described binder (preferably a vinyl chloride-vinyl acetate copolymer) and a part of a solvent used for preparing the nonmagnetic coating composition by a kneader under pressure or a roll, and then mixing and dispersing the resulting kneaded mixture in the rest of materials for the nonmagnetic coating composition (preferably a polyester resin, a polyisocyanate and the rest of the solvent). For example, a nonmagnetic coating composition containing 150 parts by weight of carbon black, 70 parts by weight of the binder and 300 parts by weight of a solvent are prepared by mixing and kneading 150 parts by weight of carbon black, from 35 to 56 parts by weight of a vinyl chloride-vinyl acetate copolymer and 30 parts by weight of a solvent, and then dispersing the resulting mixture in a mixture of from 0.7 to 28 parts by weight of a polyester resin, from 7 to 34 parts by weight of a polyisocyanate and 270 parts by weight of the solvent.

The method for forming a backing layer on the opposite surface of the nonmagnetic support to the magnetic layer can be any already known method. Thus, the backing layer of the magnetic recording medium of this invention can be formed on the surface of the support by a conventional method. For example, the thus-prepared nonmagnetic coating composition as described above can be coated on the surface of the support, dried to evaporate the solvent, and then the binder component can be hardened to form a backing layer.

The thickness of the backing layer is generally from 0.3 to 2.0 μm, preferably from 0.4 to 1.0 μm.

The method for coating the above-described nonmagnetic coating composition and the apparatus used therein can be conventional ones.

The order of providing the magnetic layer and the backing layer on a support is optional and both layers may be provided simultaneously. Further, any one of the magnetic layer or the backing layer (preferably the magnetic layer) can be coated, dried, and then if desired, can be subjected to a hardening treatment by heating to harden the coated layer (preferably the magnetic layer), and then the other layer (preferably the backing layer) can be provided, dried and heat-hardened similar to the above to obtain a bulk magnetic tape.

A lubricating agent may be present on the surface of the backing layer of the magnetic recording medium of this invention. The lubricating agents can be on the surface of the backing layer by dissolving or dispersing the lubricating agent in the nonmagnetic coating composition for the backing layer, or by coating onto the backing layer a thin film of a solution of an organic solvent having dissolved therein the lubricating agent and drying, or by coating a solution of an organic solvent having dissolved therein lubricating agent on the surface of the magnetic layer and then piling or stacking the magnetic layer on the above-described backing layer.

Examples of lubricating agents which can be used include organic compounds such as a higher fatty acid, metal soap, a higher fatty acid amide, a higher fatty acid ester, mineral oil or oil and fat, silicon oil, inorganic fine particles, plastic particles, α-olefin polymer, unsaturated aliphatic hydrocarbon which is liquid at a normal temperature, fluorocarbons and mixtures thereof.

Examples and Comparative Examples of this invention are illustrated below.

In each example, all parts are by weight.

EXAMPLES 1 TO 10

A magnetic coating composition having the following composition and prepared by the following manner was coated on a polyethylene terephthalate base (non-magnetic support) having a thickness of 20 μm, in a dry thickness of 6.0 μm, and then was provided with magnetic orientation, dried and provided with a calendering treatment.

Then, a nonmagnetic coating composition for a backing layer having the following composition and prepared in the following manner was coated on the surface of the polyethylene terephthalate which was not coated with the magnetic coating composition, in a dry thickness of 1.0 μm.

After coating of the backing layer composition, drying and surface smoothing treatment of the backing layer were provided and immediately thereafter the coated film was wound up.

The wound bulk film was hardened by heating at 40° C. for 48 hours and was slit to a width of ½ inch to prepare a sample tape.

The sample tapes were evaluated in the following manner and the results are shown in Table 1.

| Magnetic Coating Composition | |
|---|---|
| *Co-Containing γ-Fe$_2$O$_3$ Particles (specific surface area by nitrogen adsorption method: 40 m$^2$/g, Hc of particles: 850 Oe) | 300 parts |
| *Copolymer of Vinyl Chloride and Vinyl Acetate ("VMCH" produced by Union Carbide Co., Ltd.) | 40 parts |
| *Polyurethane Resin ("UR8300" produced by Toyobo Co., Ltd.) | 17 parts |
| *Carbon Black (average particle size: 20 mμ) | 15 parts |
| Lecithin | 1.5 parts |
| Oleic Acid | 3 parts |

-continued

| Magnetic Coating Composition | |
|---|---|
| Octyl Laurate | 4 parts |
| Lauric Acid | 3 parts |
| *Butyl Acetate | 700 parts |
| Methyl Ethyl Ketone | 300 parts |

A part of the above composition (i.e., consisting of the components indicated with "*") was put in a ball mill, sufficiently mixed and kneaded, the rest of the composition was added in the ball mill, sufficiently mixed and kneaded, 24 parts of polyisocyanate compound ("Coronate 3040", produced by Nippon Polyurethane Co., Ltd.) was added, further mixed, kneaded and dispersed to prepare the magnetic coating composition.

| Nonmagnetic Coating Composition for a Backing Layer | |
|---|---|
| Copolymer of Vinyl Chloride and Vinyl Acetate ("DX-86" produced by Denki Kagaku Kogyo Kabushiki Kaisha) | 70 parts in total (composition ratio shown in Table 1 below) |
| Polyester Resin ("Stafix", produced by Fuji Photo Film Co., Ltd.) | |
| Polyisocyanate Resin ("Coronate L", produced by Nippon Polyurethane Co., Ltd.) | |
| Carbon Black ("Vulcan XC-72", produced by Cabott Co., Ltd., average particle diameter: 30 mμ) | 150 parts |
| Methyl Ethyl Ketone | 300 parts |

To prepare the above composition, a mixture of the copolymer of vinyl chloride and vinyl acetate, carbon black and 250 parts of methyl ethyl ketone was sufficiently mixed and kneaded by a roll for 60 minutes. Then, the resulting mixture, the polyester resin, the polyisocyanate resin and the rest of the methyl ethyl ketone were sufficiently dispersed in the ball mill, and the viscosity thereof was adjusted to prepare the nonmagnetic coating composition for the backing layer.

Evaluation of Sample Tapes

Video S/N

The video S/N (signal/noise) ratio was measured using a noise meter ("925C" produced by Shibasoku Co., Ltd.). The results are shown in Table 1 in relative values as compared to a tape of "Super XGT-120" produced by Fuji Photo Film Co., Ltd. which was used as a standard tape. The tapes were recorded with a video tape recorder "NV-8300" produced by Matsushita Electric Industrial Co., Ltd., and the noise on the recorded tapes was measured with the noise meter as described above using a low-pass filter (4 MHz) and a high-pass filter (10 KHz).

Dropout

The sample tapes were mounted on a VHS tape deck and were run for 250 passes. Then, the number of dropouts of 15 μsec and −20 dB per 1 minute was measured using a dropout counter "VD-3D" produced by Victor Company of Japan, Limited.

Wear-Out of a Backing Layer

Sample tapes of 5 min-length were repeatedly made run for 250 passes (play-rewind) on the tape deck, and the scratches made on the backing layer of the sample tapes were visually observed and were evaluated based on the following three levels.

| Number of Scratches | Level |
|---|---|
| 0 | ○ |
| 1-5 | Δ |
| 6 or more | x |

TABLE 1

| Ex- ample No. | Compounding Ratio of Binder (wt %) | | | Results of Evaluation | | |
|---|---|---|---|---|---|---|
| | Vinyl Chloride- Vinyl Acetate | Poly- ester | Polyiso- cyanate | Drop- out | S/N | Wear-Out of Backing Layer |
| 1 | 77 | 1 | 22 | 20 | +1.8 | Δ |
| 2 | 73 | 5 | 22 | 15 | +2.1 | ○ |
| 3 | 68 | 10 | 22 | 12 | +1.8 | ○ |
| 4 | 58 | 20 | 22 | 17 | +1.5 | ○ |
| 5 | 54 | 1 | 45 | 20 | +1.0 | Δ |
| 6 | 50 | 5 | 45 | 15 | 0 | ○ |
| 7 | 84 | 1 | 15 | 60 | +1.7 | Δ |
| 8 | 80 | 5 | 15 | 10 | +1.9 | ○ |
| 9 | 75 | 10 | 15 | 18 | +2.4 | ○ |
| 10 | 65 | 20 | 15 | 27 | +2.3 | ○ |

COMPARATIVE EXAMPLES 1 to 9

The same procedure as in Example 1 was repeated to prepare sample tapes, except that the composition ratio of vinyl chloride-vinyl acetate copolymer, polyester resin and polyisocyanate resin in the non-magnetic coating composition for the backing layer was changed to those as shown in Table 2 below (the total parts of these three resins were 70 parts by weight).

The tapes were evaluated in the above-described manner and the results thereof are shown in Table 2.

COMPARATIVE EXAMPLES 10 AND 11

The same procedure as that in Example 1 was repeated to prepare sample tapes, except that the entire amount of the same nonmagnetic coating composition for the backing layer as that used in Example 2 was put in a ball mill at once and was sufficiently mixed, kneaded and dispersed to prepare Comparative Example 10. Comparative Example 11 was prepared in the same manner as Comparative Example 10 except that the entire amount of the non-magnetic coating composition for the backing layer as that used in Example 3 was employed.

The tapes were evaluated in the above-described manner and the results thereof are shown in Table 2.

TABLE 2

| Compara- tive Example No. | Compounding Ratio of Binder (wt %) | | | Results of Evaluation | | |
|---|---|---|---|---|---|---|
| | Vinyl Chloride- Vinyl Acetate | Poly- ester | Poly- isocya- nate | Drop- out | S/N | Wear- Out of Backing Layer |
| 1 | 78 | 0 | 22 | 100 | +1.7 | x |
| 2 | 38 | 40 | 22 | 30 | −2.0 | Δ |
| 3 | 28 | 50 | 22 | 40 | −2.5 | x |
| 4 | 45 | 10 | 45 | 30 | −1.5 | x |
| 5 | 35 | 20 | 45 | 60 | −2.4 | x |
| 6 | 15 | 40 | 45 | 50 | −3.0 | x |
| 7 | 45 | 40 | 15 | 50 | −0.5 | Δ |
| 8 | 90 | 10 | 0 | 200 or higher | +2.6 | x |
| 9 | 0 | 50 | 50 | 200 or higher | −2.3 | x |

TABLE 2-continued

| Comparative Example No. | Compounding Ratio of Binder (wt %) | | | Results of Evaluation | | |
|---|---|---|---|---|---|---|
| | Vinyl Chloride-Vinyl Acetate | Polyester | Polyisocyanate | Dropout | S/N | Wear-Out of Backing Layer |
| 10 | 73 | 5 | 22 | 15 | −3.5 | o |
| 11 | 68 | 10 | 22 | 10 | −4.5 | o |

COMPARATIVE EXAMPLE 12

The same procedure as that in Example 1 was repeated to prepare a sample tape, except that the formulation of the nonmagnetic composition for the backing layer was changed to that shown below. The thus-obtained sample tape was evaluated in the above-described manner and the results are shown in Table 3.

| Formulation for the Nonmagnetic Composition for the Backing Layer | |
|---|---|
| Copolymer of Vinyl Chloride and Vinyl Acetate ("DX-86", produced by Denki Kagaku Kogyo Kabushiki Kaisha) | 42.4 parts |
| Polyurethane Resin ("N-2301", produced by Nippon Polyurethane Co., Ltd.) | 11.3 parts |
| Polyisocyanate Resin ("Coronate L", produced by Nippon Polyurethane Co., Ltd.) | 16.3 parts |
| Carbon Black ("Vulcan XC-72", produced by Cabott Co., Ltd.) | 150 parts |
| Methyl Ethyl Ketone | 300 parts |

COMPARATIVE EXAMPLE 13

The same procedure as in Example 1 was repeated to prepare a sample tape, except that the formulation of the nonmagnetic coating composition for the backing layer was changed to that shown below.

The thus obtained sample tape was evaluated in the above-described manner and the results are shown in Table 3.

| Formulation of the Nonmagnetic Coating Composition for the Backing Layer | |
|---|---|
| Copolymer of Vinyl Chloride and Vinyl Acetate ("DX-86", produced by Denki Kagaku Kogyo Kabushiki Kaisha) | 25.4 parts |
| Polyurethane Resin ("N-2301", produced by Nippon Polyurethane Co., Ltd.) | 8.1 parts |
| Fibrous Resin (nitrocellulose produced by Asahi Kasei Kogyo Kabushiki Kaisha) | 20.2 parts |
| Polyisocyanate Resin ("Coronate L", produced by Nippon Polyurethane Co., Ltd.) | 16.3 parts |
| Carbon Black ("Vulcan XC-72", produced by Cabott Co., Ltd.) | 150 parts |
| Methyl Ethyl Ketone | 300 parts |

COMPARATIVE EXAMPLE 14

The same procedure as that in Example 1 was repeated to prepare a sample tape, except that the formulation of the nonmagnetic composition for the backing layer was changed to that shown below. The thus-obtained sample tape was evaluated in the above-described manner and the results are shown in Table 3.

| Formulation of the Nonmagnetic Coating Composition for the Backing Layer | |
|---|---|
| Fibrous Resin ("Nitrocellulose" produced by Asahi Kasei Kogyo Kabushiki Kaisha) | 40.0 parts |
| Polyurethane Resin ("N-2301", produced by Nippon Polyurethane Co., Ltd.) | 8.1 parts |
| Polyester Resin ("Stafix", produced by Fuji Phot Film Co., Ltd.) | 5.6 parts |
| Polyisocyanate Resin ("Coronate L", produced by Nippon Polyurethane Co., Ltd.) | 16.3 parts |
| Carbon Black ("Vulcan XC-72", produced by Cabott Co., Ltd.) | 150 parts |
| Methyl Ethyl Ketone | 300 parts |

TABLE 3

| Comparative Example No. | Dropout | S/N | Wear-Out of Backing Layer |
|---|---|---|---|
| 12 | 200 or higher | +1.5 | x |
| 13 | 200 or higher | +1.5 | x |
| 14 | 200 or higher | −1.0 | x |

When the results of Table 1 of the magnetic recording medium of this invention are compared with those of Tables 2 and 3 of the magnetic recording medium of the Comparative Examples, it can be seen that the magnetic recording medium of this invention exhibits more excellent properties in every respect as to dropout, video S/N and wear-out of the backing layer.

In a conventional magnetic recording medium, as the backing layer is made thinner, the backing layer tends to be easily damaged and worn-out while the tape is running. On the other hand, in the magnetic recording medium of this invention, even at the higher density recording with recording wavelength of 1 μm or lower, decrease of video S/N, and increase of dropout do not take place, head clogging takes place with difficulty and running durability is extremely excellent While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a magnetic layer formed from a magnetic coating composition containing ferromagnetic particles and coated on one surface of a non-magnetic support, and on the opposite surface of the non-magnetic support a backing layer is formed thereon from a nonmagnetic coating composition containing a solvent and non-magnetic particles dispersed in a binder, wherein the nonmagnetic coating composition is prepared by mixing and kneading the nonmagnetic particles, a part of the binder and a part of a solvent by a kneader under pressure or a roll, and then dispersing the resulting kneaded mixture in the rest of materials for the nonmagnetic coating composition, and wherein the binder in the backing layer comprises a vinyl chloride-vinyl acetate copolymer of from 50 to 80 parts by weight, a polyester resin of from 1 to 40 parts by weight, and a polyisocyanate of from 10 to 49 parts by weight, per 100 parts by weight of the binder.

2. The magnetic recording medium according to claim 1, wherein the copolymer of vinyl chloride and vinyl acetate is present in an amount of 55 to 75 parts by weight, the polyester is present in an amount of from 1 to 20 parts by weight, and the polyisocyanate is present in an amount of 15 to 45 parts by weight.

3. The magnetic recording medium according to claim 1, wherein the copolymer of vinyl chloride and vinyl acetate has an average degree of polymerization of from 400 to 500, and the structural unit derived from vinyl acetate is present in an amount of 1 to 15 weight percent based on the weight of the copolymer.

4. A method for preparing a magnetic recording medium which comprises coating a magnetic coating composition containing ferromagnetic particles on one surface of a nonmagnetic support to form a magnetic layer, and coating on the opposite surface of the nonmagnetic support a nonmagnetic coating composition containing a solvent and nonmagnetic particles dispersed in a binder containing a vinyl chloride-vinyl acetate copolymer, a polyester resin and a polyisocyanate to form a backing layer, wherein the nonmagnetic coating composition is prepared by mixing and kneading the nonmagnetic particles, a part of the binder and a part of a solvent by a kneader under pressure or a roll, and then dispersing the resulting kneaded mixture in the rest of materials for the nonmagnetic coating composition, and wherein the binder comprises 50 to 80 parts by weight of the vinyl chloride-vinyl acetate copolymer, 1 to 40 parts by weight of the polyester resin, and 10 to 49 parts by weight of the polyisocyanate, per 100 parts by weight of the binder.

* * * * *